United States Patent Office 3,428,557
Patented Feb. 18, 1969

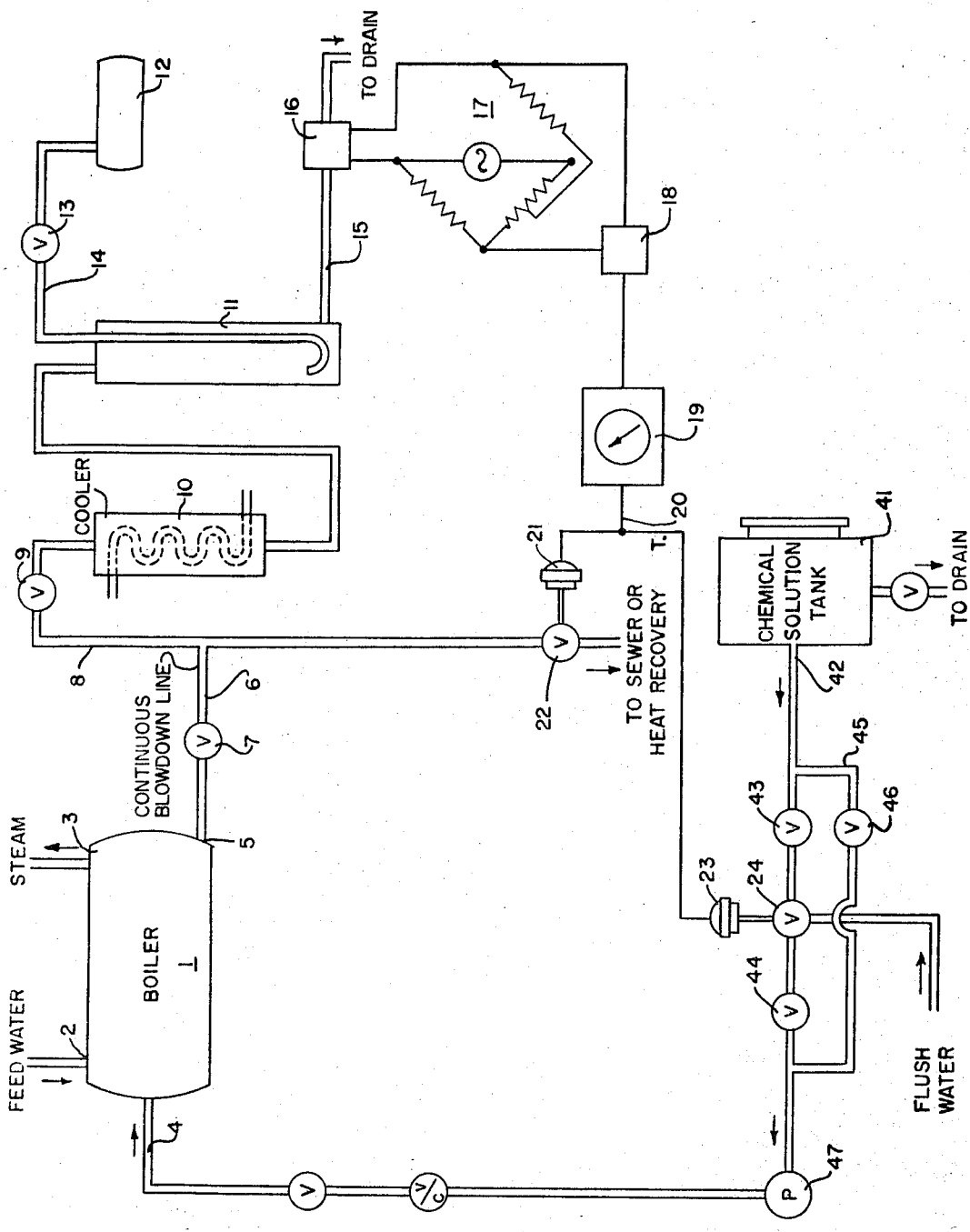

3,428,557
METHOD AND APPARATUS FOR CONTROLLING BOILER SYSTEMS
Hubert M. Rivers, Upper St. Clair Township, Allegheny County, Pa., assignor to Calgon Corporation, a corporation of Pennsylvania
Filed Sept. 19, 1966, Ser. No. 580,452
U.S. Cl. 210—59      5 Claims
Int. Cl. C02b 3/06

ABSTRACT OF THE DISCLOSURE

This invention provides a method and apparatus for treating input water to a boiler and blowdown therefrom by the steps of measuring the conductivity of the water in the boiler and simultaneously feeding water treating chemicals into the boiler in response to the measured conductivity and regulating the blowdown in response to the measured conductivity to maintain a predetermined conductivity in the boiler. Means are provided for generating a control signal representative of conductivity, means for feeding water treating chemicals into the boiler in response to said control signal and means for simultaneously blowing down the boiler in response to said control signal.

---

This invention relates to the chemical treatment of boiler water.

The make-up water customarily provided for steam generating boilers contains a variety of naturally-occurring contaminants which, if not removed or counteracted, will create difficulties of boiler maintenance and operation. Calcium and magnesium hardness, for example, tend to form adherent deposits on boiler surfaces which reduce their ability to pass heat; dissolved oxygen attacks boiler steel, producing corrosion in the form of pits; mineral solids left behind when water is converted to steam may sometimes concentrate sufficiently to create a foaming condition that causes boiler water to be entrained in the steam; etc. These properties of naturally-occurring contaminants in boiler feedwater are well known, as are also the hazards and the costs entailed by unscheduled outages, boiler repairs, chemical or mechanical boiler cleaning, and less efficient plant operation which result from improperly conditioned boiler water.

Some or all of the contaminants may be removed from the feedwater by chemical or mechanical means externally of the boilers. It has long been a general and widespread practice, however, to add to the boiler water one or more specific treating chemicals whose function is to obviate the costly or otherwise undesirable effects of contaminants in the boiler feedwater. For example, a soluble phosphate salt may be used to counteract the scale-forming tendencies of calcium and its compounds; soluble silicates are sometimes used to prevent deposition of adherent magnesium compounds; sodium sulfite may be used to remove corrosive dissolved oxygen; an organic dispersive agent may be employed to render precipitated sludges more fluid, thereby expediting their removal through boiler blowdown and minimizing their tendency to lodge on heat transfer surfaces; an antifoam agent may be used to minimize the entrainment of boiler water in steam; sodium nitrate may be fed as a safeguard against intercrystalline cracking of boiler steel; and so on. The use of such water conditioning chemicals is considered essential to safe and economical operation of most boiler plants throughout the world today.

Ordinarily, the amount of a specific chemical that must be fed in a given period of time is proportional to the input of a particular feedwater contaminant plus the quantity of treating chemical necessarily removed through blowdown during that time interval. If the contaminants that require treatment were introduced into the boiler at a constant rate, and if the rate of blowdown removal were also uniform, then the feeding of optimum amounts of treating chemicals would present no problem. In the vast majority of boilers, however, blowdown rates and contaminant input rates are subject to considerable variation, depending upon local operating conditions. This not only complicates greatly the task of feeding the proper amounts of treating chemicals, but it also intensifies the need to maintain optimum control over boiler water chemical conditions at all times. If, for any reason, insufficient amounts of treating chemicals are fed, then scale deposition, corrosion, steam contamination, or other difficulties may result. On the other hand, should the dosage of treating chemicals materially exceed that required for proper conditioning of the boiler water, the excesses of treating chemicals may themselves promote objectionable deposits, corrosion, or steam contamination; and treatment costs will be unnecessarily high. Therefore, in order that proper concentrations be maintained in the boiler water at all times, the rate of chemical addition must vary systematically in relation to all changes in the rate of contaminant input and the rate of blowdown withdrawal.

Many circumstances of normal boiler plant operation may produce wide and often unpredictable variations in the rates of contaminant input and blowdown withdrawal. For example, when boiler make-up comes from a pond, stream or other surface water supply, its composition may fluctuate widely—rather gradually with changing seasons of the year or, sometimes, quite abruptly as a result of flash runoff. If the make-up is a mixture of well waters of different compositions, normal changes in the proportions of water from the various wells will naturally affect the composition of the make-up water mixture. In most boiler plants, the feedwater consists of treated or untreated make-up plus return condensate. Even when the boiler loading is steady, the proportion of return condensate in the feedwater may vary, directly influencing blowdown requirements as well as the rate of contaminant input. Boiler loading itself, being subject to variable demands for steam, most specifically influences the rates of contaminant input and blowdown which, in turn, determine the rate at which treating chemicals must be fed. All of the aforementioned variables affect the rate at which dissolved and suspended solids accumulate in the boiler. Blowdown rate must be varied accordingly so the total concentration of solids in the boiler water is maintained at some predetermined level consistent with economical and proper boiler performance; this fluctuation in blowdown rate produces, in turn, a corresponding change in the requirements for treating chemicals. In order for chemical treatment of the boiler water to be both effective and economical, variations in the rate of chemical addition must be accurately matched against variations in the rate of contaminant input to the boiler and the rate of blowdown withdrawal from the boiler.

At the present time, as for many years in the past, chemical additions are generally regulated according to chemical tests made periodically on samples of water taken from the boiler. A specified residual of each treating chemical must be maintained in the boiler water to provide assurance that the desired chemical reactions will proceed to completion. Overtreatment, on the other hand, is unnecessarily costly and, as has been pointed out above, may result in offensive deposits, corrosion, or steam contamination. If tests reveal that the residual concentration of a particular treating chemical is above or below the desired control range, the chemical addition is accordingly decreased or increased within the period until the next sample is taken and tested. The chemical feed is, of course, dependent upon the operator's ability to predict what the chemical requirements will be during the interval before samples are tested again. Such manual control of chemical additions is practical only when the rates of contaminant input and blowdown withdrawal can be anticipated with reasonable accuracy between successive sampling periods. Quite frequently, however, normal but unpredictable fluctuations in make-up water composition, percent make-up, and, particularly, boiler load create wide variations in blowdown demand and the rate of contaminant input, making it difficult for the operator to accurately anticipate chemical requirements between one sampling period and the next. In such cases, the operator must choose one or the other of two alternative courses of action, both of which are undesirable—either he must accept the hazards and the boiler maintenance and operating difficulties that come with irregularities in boiler water chemical control, or he must assume the additional cost and inconvenience of increasing the frequency of sampling and testing the boiler water and manually adjusting the chemical feed rate.

Prior to the present invention, various schemes have been employed whereby chemical additions are made in proportion to metered flow of steam, feedwater, or make-up water. All of these schemes embody various shortcomings which limit their applicability. For example, feeding chemicals in proportion to steam flow is practical only if the composition of the make-up water remains substantially constant while percent make-up and percent blowdown remain uniform; and these conditions are seldom, if ever, attained in practice. Chemical feed based on metered feedwater flow is uncertain because, with few exceptions, feedwater flow is not necessarily related to make-up water composition, percent make-up, or percent blowdown. Metered make-up water flow is a reliable basis for chemical feed proportioning only when the composition of the make-up water remains substantially constant and while the blowdown rate bears a fixed relationship to make-up flow. Although the manual and automatic feed schemes employed in the past are capable of achieving satisfactory chemical control within specific and limited fields of applicability, none of them embodies the versatility and accuracy required for precise control over boiler water concentrations such as must be maintained in a great many contemporary steam generating plants.

I have invented a method and apparatus for maintaining proper boiler water chemical concentrations at all times regardless of variations in boiler load, blowdown rate, make-up rate, percent condensate in the feedwater, or concentration of total solids in the make-up water.

My invention provides a method of simultaneously treating input water to a boiler and regulating blowdown from said boiler by the steps of measuring conductivity of the water in the boiler and simultaneously feeding water treating chemicals into the boiler and regulating the blowdown flow to maintain a predetermined conductivity in the boiler. I also provide an apparatus for use in a boiler system comprising means for measuring conductivity of water in the boiler system, blowdown valve means, input chemical feed means to the water in the boiler, and control means operated by the means for measuring conductivity actuating the blowdown valve means and chemical feed means simultaneously to blowdown the boiler and feed chemicals to maintain a pre-set conductivity in the boiler. In short my invention provides for a method and apparatus such that both blowdown and treating chemical feed into the boiler are controlled by conductivity of the boiler water to maintain the conductivity at a pre-set value, in such a way that an increase in conductivity will increase the blowdown and simultaneously increase the rate of feeding boiler treatment chemicals into the boiler. In this application, when I refer to "blowdown," I mean the water withdrawn from the boiler to remove contaminants introduced with the feedwater and concentrated in the boiler when water is evaporated to make steam. In effect, I feed treating chemicals in relation to the loss of chemicals through blowdown, thereby maintaining the required precision of control over boiler water concentrations. The chemicals may be fed into the make-up or feedwater lines or directly into the boiler.

I have already mentioned in this specification that chemical requirements depend upon (1) the rate at which contaminants requiring treatment enter the boiler, and (2) the rate at which water is withdrawn from the boiler through blowdown. Any specific chemical employed to nullify the unwanted effects of a particular contaminant (such as, for example, the phosphate used to prevent deposition of calcium scale materials or the sodium sulfite used to prevent oxygen corrosion) must be fed in quantity sufficient to react with that amount of contaminant introduced into the boiler by the boiler feedwater. In addition, a specified excess of each treating chemical must be maintained in the boiler water to cause the desired chemical reactions to take place and proceed to completion. Since these residuals of treating chemicals are present in the boiler water, active chemical thus removed from the boiler must be replaced by proper adjustment of the chemical feed rate. In substance, my invention provides that the chemical feed is varied along with blowdown flow by way of a common control signal representing conductivity of the water within the boiler.

Many boiler plants employ make-up water that has been softened by means of ion-exchange or chemical treatment with lime, soda ash, or other suitable reactant. Because the relative proportions of the contaminants present are relatively constant in water so treated, chemical requirements are substantially equal to the loss of chemicals through blowdown. Here, by feeding chemicals in accordance with conductivity and at the same time controlling blowdown by conductivity, my invention provides a simple and straightforward means of maintaining control over concentration of treating chemicals in the boiler water. Make-up water in other plants may be unsoftened and contain appreciable amounts of contaminants that require chemical treatment. Very frequently, however, the ratio of such contaminants to total solids in the unsoftened make-up water remains substantially constant over fairly long periods of time, even though the total solids concentration of the make-up water may fluctuate over a rather wide range. In these cases, the contaminants requiring treatment bear a substantially constant relationship to total solids introduced with the make-up water, and these total solids ultimately govern the blowdown rate when blowdown is controlled to maintain a specified concentration of total solids in the boiler water; then regulating the blowdown rate and simultaneously the feeding of chemicals in relation to a pre-set conductivity value for the boiler water provides an accurate means of maintaining substantially constant chemical concentrations in the boiler water. Thus my invention provides a new method for controlling boiler systems, through the simultaneous control of blowdown flow and treatment chemical input based on maintenance of a pre-fixed conductivity in the boiler.

When blowdown rate is regulated so as to control the concentration of some boiler water constituent that bears a constant relationship to boiler water solids concentration, indirect but nevertheless effective control over solids concentration in the boiler water is achieved by regulating blowdown in direct relation to conductivity. Such blowdown control may be accomplished automatically by means of continuous conductivity measuring-controlling equipment, which equipment is aready known in the art. When measured accurately by means of appropriate apparatus, the electrical conductivity of boiler water is approximately proportional to the concentration of dissolved solids. This proportionality factor may vary somewhat from one plant to the next but remains substantially constant in most individual boiler installations.

In those relatively few cases where hydroxides comprise an appreciable and variable percentage of the boiler water solids, it may be necessary to neutralize the continuously flowing sample prior to conductivity measurement. Where this is the case, neutralization of the hydroxyl ion to provide accurate measurement of dissolved solids concentration may be accomplished by a method such as that described in the United States patent of Kaufman et al., No. 2,964,024, entitled "Method of and Apparatus for Controlling the Concentration of Dissolved Solids in Steam Boiler Water." Experience has amply proven that conductivity measurement provides a trustworthy basis for estimating boiler water solids concentrations. Therefore, apparatus for measuring the conductivity of a continuously flowing sample can be employed to generate an electrical, pneumatic, or other loading signal proportional to boiler water solids concentration. This signal then can serve to open or close a continuous blowdown regulating valve so as to hold boiler water solids concentration within the desired range, regardless of variations in boiler load, percent make-up, or concentration of solids in the make-up water or in the feed-water.

In the rare instances where variations in alkalinity (that is, the total bicarbonate, carbonate, and/or hydroxide) may significantly affect chemical control, my invention may employ one or more continuous analyzers to measure the alkalinity in the boiler water. For example, a variation in the ratio of alkaline constituents to total solids in the make-up water may call for specific adjustment in the feed rate of (1) an alkaline treating chemical such as soda ash or caustic soda, (2) a moderately alkaline chemical such as disodium orthophosphate, or (3) an alkali reducing material such as monosodium orthophosphate or sodium acid sulfate. In order to achieve precise control over boiler water alkalinity, I measure continuously the conductivity of a flowing sample before and after neutralization by continuous addition of carbon dioxide gas in a suitable reaction chamber. The difference between these two conductivity values is a measure of boiler water alkalinity concentration. One of several available methods is used to generate an electrical, pneumatic or other indexing signal corresponding to the difference between the conductivity readings obtained before and after neutralization; this indexing signal is then used as a basis for controlling the alkalinity by activating an appropriate chemical feeder. In this way, the amount of alkali-controlling chemical fed is increased or decreased, as required, so that boiler water alkalinity (as measured by the difference between conductivity measurements made on neutralized and unneutralized boiler water) is maintained within a predetermined control range.

In those instances where boiler make-up is softened, the amount of phosphate chemical required to prevent deposition of calcium scale materials is substantially equal to or only moderately greater than that required to replace phosphate chemical lost through blowdown; such boiler plants will be able to maintain very close control over boiler water phosphate concentration simply by feeding the phosphate chemical in direct proportion to other chemicals fed to the system. There will be some installations, however, where the ratio of calcium to total solids in the make-up water or in the feedwater may vary significantly during relatively short intervals of time. Such variations in the ratio of calcium to total solids may cause an undesirable amount of fluctuation in boiler water phosphate concentration when phosphate treating chemical is fed strictly in proportion to conductivity and when blowdown is regulated to maintain boiler water solids concentration at some predetermined conductivity level. Should circumstances warrant the elaboration, my invention incorporates a continuous phosphate analyzer capable of generating an electrical or pneumatic indexing signal which is directly correlated to boiler water phosphate concentration. This phosphate-correlated indexing signal effects a biasing of the conductivity output signal which activates the phosphate feeder; thus, the amount of phosphate chemical fed per unit quantity of chemical feed is varied as required to hold boiler water phosphate concentration within desired limits independently of variations in the ratio of calcium to total solids in the make-up water (or in the feedwater). Similar means can be employed for controlling the addition of treating chemicals other than phosphate. Apparatus which is more than adequate for continuously determining the quantity of phosphate, silicate, or other chemicals in boiler water is disclosed in the patent application of Luppold and Stough, S.N. 861,589, dated Dec. 23, 1959, entitled "Apparatus for Continuous Analysis of Solutions and Gases," now abandoned. An automatic continuous photoelectric colorimeter may be constructed according to the teachings therein. An automatic continuous photoelectric colorimeter such as that referred to above may be made to generate an indexing signal which is a function of the concentration of the particular chemical being tested for, as disclosed in the above-mentioned patent application. This signal may, as mentioned above, be used to bias the signal emitted by the conductivity meter which controls the phosphate feed. The signal representing phosphate may also be used in some circumstances to bias the blowdown valve control.

A purely illustrative embodiment of my invention is shown in more or less diagrammatic fashion in the accompanying drawing. A boiler 1 is provided with an inlet for feedwater 2, and outlet for steam 3, an inlet 4 for treating chemical and an outlet 5 for blowdown. A blowdown line 6 is connected through valve 7 with the blowdown outlet 5. On the blowdown line 6 is attached a sampling line 8 which may be provided with a valve 9 controlling flow of a sample through cooling means 10 and into a neutralizer vessel 11. The boiler water sample in vessel 11 is neutralized by an agent such as $CO_2$ gas. The neutralizing agent is supplied by a tank or cylinder 12 provided with a valve 13 in a feed line 14 which extends into vessel 11 to a point such that the neutralizing agent ($CO_2$) comes intimately in contact with the sample in vessel 11. A conductivity sample line 15 is connected to vessel 11 to carry the test sample to conductivity cell 16. Conductivity readings taken in the conductivity cell are controlled by the Wheatstone bridge circuit 17 and amplifier 18 and are fed to a recorder regulator or conductivity meter 19 all of conventional form. The recorder regulator 19 generates a pneumatic signal which is a function of conductivity. The pneumatic signal is transmitted through line 20 to controller 21 on blowdown valve 22 and to controller 23 on valve 24.

A chemical solution tank 41 is provided with an outlet 42 leading through valve 43, valve 24 and valve 44. Bypass 45 is provided with valve 46. Pump 47 is also provided on the line leading to inlet 4 of the boiler. Valve 24, appropriately positioned by controller 23, regulates the ratio of chemical solution to flush water, and thus the rate of chemical supplied, to pump 47. Pump 47, in this particular arrangement, operates constantly.

Boiler water level control, feedwater control, fuel control and the like are, of course, not shown. Although they each affect the operation of my invention, compensation for each is entirely independent of any direct measurement. Obviously, as the demand for steam increases, fuel input is increased to maintain steam pressure, the water level in the boiler tends to recede, calling for addition of more feedwater. Contaminants introduced with the feedwater become concentrated by conversion of water to steam; the resulting increase in boiler water conductivity is sensed by the conductivity-measuring device, which then causes the blowdown and chemical feed controllers to respond appropriately.

Referring again to the drawing, a sample of boiler water is fed, preferably continuously, from the blowdown line 6 into the conductivity cell 16. The conductivity meter generates a signal which may be pneumatic or electrical, or any other practical control signal proportional to the conductivity of the blowdown water. Indeed, any of the signals represented as pneumatic in this specification may equally as well be electrical or any other suitable signal. Conversely, an electric control signal may equally as well as pneumatic. Since the water in the blowdown line contains the same concentration of dissolved solids as the water in the boiler, and since the conductivity of a solution of solids is proportional to their concentration, the signal thus generated will be a function of the concentration of dissolved solids in the boiler water. Set point and/or biasing means (not shown) will preferably be provided in the same housing as the conductivity recorder.

Preferably I provide for continuous blowdown and chemical feed regulated of course by the conductivity of the boiler water. I may also provide intermittent control for the blowdown valve and chemical feed means but this is a matter of choice and is not illustrated.

Although any standard conductivity cell, conductivity meter and signal generating apparatus will be satisfactory, I have used the "PowrLog" Model H–O conductivity apparatus described in specification sheet OE–10004 of Hagan Chemicals & Controls, Inc., with satisfactory results.

In summary, it can be seen that the apparatus disclosed provides one means for carrying out my complete method of boiler control which comprises removing blowdown water from the boiler in response to a signal representing the conductivity of the blowdown water, and adding treatment chemical to the feedwater or to the boiler water at a rate responsive to the same signal representing conductivity.

It may be mentioned here that some chemical feeders do not operate continuously even where the signal continuously calls for chemical treatment. Rather, a commonly used feeder feeds intermittently on counting a predetermined number of pulses generated by the governing signal. Either continuous or intermittent injectors may be used in my invention.

While I have shown and described a present preferred embodiment of my invention and have illustrated certain present preferred methods of practicing the same, it is to be distinctly understood that the invention is not limited thereto but may be otherwise variously embodied and practiced within the scope of the following claims.

I claim:

1. A method of treating input water to a boiler and blowdown therefrom comprising the steps of measuring the conductivity of the water in the boiler, and simultaneously feeding water-treating chemicals into the boiler in response to the measured conductivity and regulating the blowndown flow in response to the measured conductivity to maintain a predetermined conductivity in the boiler.

2. Boiler apparatus comprising means for generating a control signal representative of conductivity, means for feeding water-treating chemicals into the boiler water in response to said control signal, and means for simultaneously blowing down the boiler in response to said control signal.

3. A boiler system comprising means for measuring the conductivity of boiler water, means for regulating the blowndown responsive to the means for measuring conductivity to maintain the conductivity of the boiler water within desired limits, and means for feeding water-treating chemicals into the boiler in relation to said conductivity in response to said means for measuring conductivity.

4. A boiler water system comprising a blowdown conduit, means connected thereto for measuring conductivity of the blowdown water and generating a control signal relative thereto, valve means responsive to said control signal for controlling blowdown flow, second valve means responsive to said control signal for feeding water-treating chemicals to the boiler in response thereto.

5. The method of treating boiler water comprising the steps of measuring the conductivity of the boiler water, regulating blowdown by said conductivity by increasing blowdown to decrease conductivity and simultaneously regulating the rate of addition of boiler water treating chemicals to the boiler by said conductivity by increasing said rate of addition as said conductivity increases.

References Cited

UNITED STATES PATENTS 1,145,509   7/1915   Pike et al. _____ 137—5

OTHER REFERENCES

Betz: Handbook of Industrial Water Conditioning, Betz Laboratories, Inc., Phila. 24, Pa., 5th edition, 1957, pp. 95–99, 139–142 and 245–249 relied on.

MICHAEL E. ROGERS, *Primary Examiner.*

U.S. Cl. X.R.

137—5, 11; 210—57, 96